UNITED STATES PATENT OFFICE.

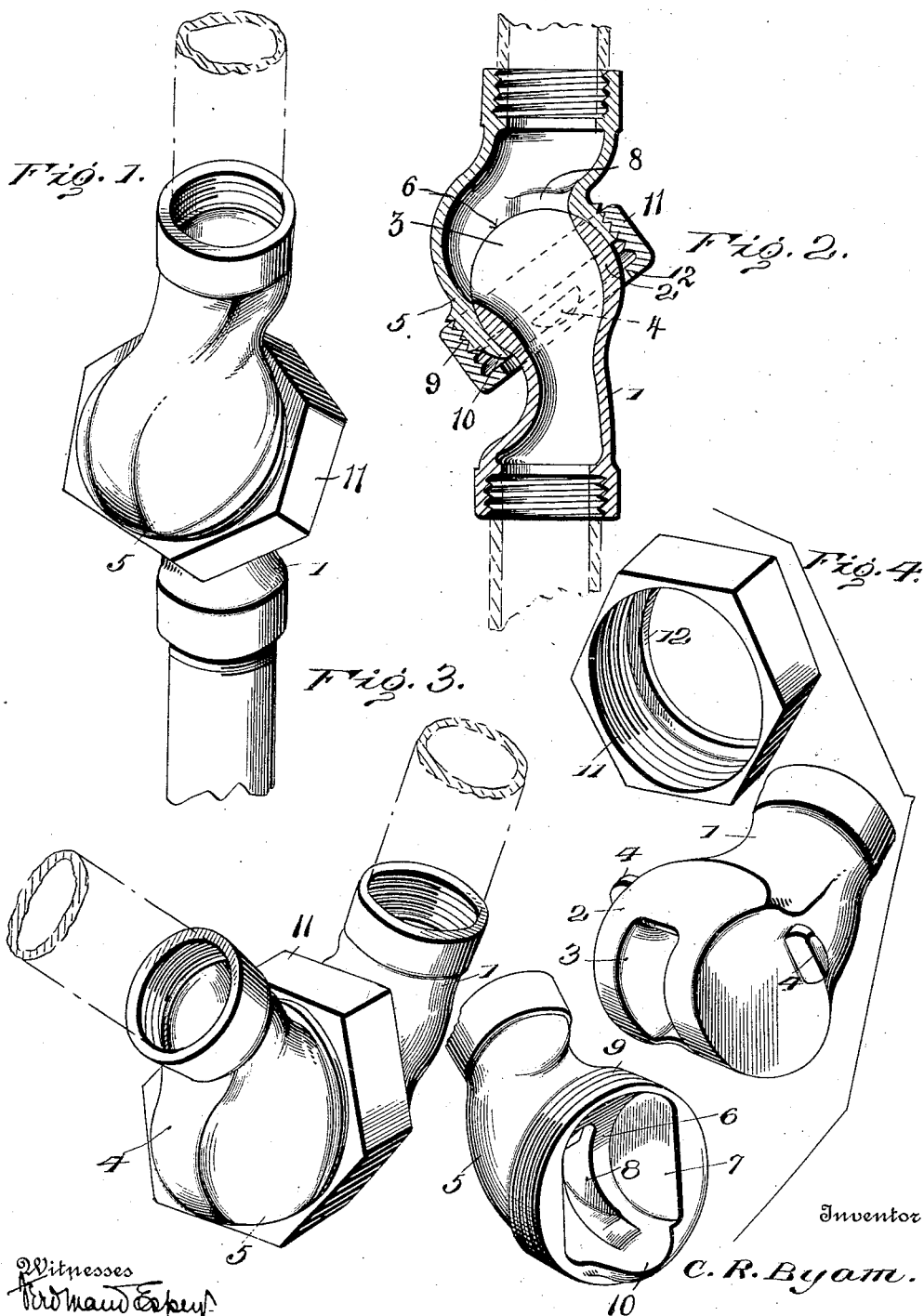

CHARLES R. BYAM, OF CHICAGO, ILLINOIS.

PIPE-FITTING.

1,067,642.  Specification of Letters Patent.  Patented July 15, 1913.

Application filed September 6, 1911. Serial No. 647,960.

*To all whom it may concern:*

Be it known that I, CHARLES R. BYAM, citizen of the United States, residing at Chicago, in the county of Cook and State of Illinois, have invented certain new and useful Improvements in Pipe-Fittings, of which the following is a specification.

This invention relates to adjustable elbow couplings and the main object of the invention is the provision of a very simple, cheap and effective coupling, so formed that two adjacent pipe sections may be connected together either in approximate alinement or at an angle to each other.

Another object is to so construct the coupling that the angle of the pipe sections to each other may be varied within an arc of approximately 180°.

Another object is to provide a coupling of the character described above in which the sections of the coupling when locked shall be rigidly held from movement in both directions, the device, however, being of such character that, if desired, the couplings may be loosely connected to each other so as to yield to permit a constant change of angular relation between the members of the coupling.

Another object is to provide a coupling adapted to connect pipe sections which are not quite in alinement with each other.

Other objects will appear in the course of the following description.

My invention is illustrated in the accompanying drawings wherein:

Figure 1 is a perspective view of the coupling and the portions of the pipe sections connected thereto, the members of the coupling being so arranged that the pipe sections are in approximate alinement with each other. Fig. 2 is a longitudinal sectional view of the same. Fig. 3 is a perspective view of the coupling, the members being arranged to form an elbow. Fig. 4 is a perspective view of the parts of the coupling separated from each other.

Corresponding and like parts are referred to in the following description and indicated in all the views of the accompanying drawings by the same reference characters.

In the drawings, 1 designates a coupling section forming a male member and having an approximately cylindrical enlarged head. This member is of course hollow and the head is slotted transversely to the axis of the head as at 3, this slot having an angular length of approximately 123 degrees. The head is also formed with the oppositely disposed lugs 4 having convexly curved outer faces. It will be seen from Fig. 2 that the body of the member is slightly curved so that the passage through the member and through the head is slightly angular and flaring toward the slot forming the opening in the head.

Coacting with the section 1 is the section 5 forming the female member which is provided with an enlarged head 6 which is approximately semispherical, this head being hollowed out so as to form an approximately semicylindrical socket 7 snugly fitting over and receiving the head 2 and being rotatably movable upon the head 2, the interior face of the socket being of course concentric to the exterior face of the head 2 when the male and female members of the coupling are fitted together. The inner face of the socket 7 is slotted as at 8, the slot having an angular length of approximately 123 degrees. The exterior of the head 5 is screw threaded as at 9 and, as shown in Fig. 4, the rim of the head 6 is formed with a projecting lip 10 whose inner face is curved so as to be continuous with the inner face of the socket 7 and form a projecting continuation of the socket. It will be noted from Fig. 2 that the axis of the passage through the member 5 is at an angle of about 45° to the face of the head 6 so that when the two sections of the coupling are connected as in Fig. 2, the passages in the members 1 and 5 will be nearly in alinement.

The two sections of the coupling are held in engagement with each other at any desired angle by means of the union nut 11 which is interiorly screw threaded and is provided at one end with the inwardly projecting flange 12. The nut 11 is adapted to be slipped over the member 1 and screwed into engagement with the screw threads 9 upon the member 5, the flange 12 under these circumstances bearing against the curved faces of the lugs 4. By turning up this nut 11, the members 1 and 5 are drawn into snug engagement with each other and held in any adjusted position.

It will be seen that when the members are in engagement with each other in any position, the slots 8 and 3 will register with each other, and that the outer face of the head 2 being rounded and the inner face of the socket 7 being rounded, the members are adapted to be rotated with relation to each other, while the faces of the head 2 and socket 7 are held in close engagement. Furthermore it will be noted that by reason of the length of the slots 3 and 8, the members may be given considerable rotation with relation to each other without impeding the passage through the coupling. Furthermore, it will be seen that one coupling member may be reversed in position relative to the other coupling, as shown in Fig. 3. It will further be obvious from Fig. 2 that the coupling member 5 may be rotated upon the coupling member 1 from a position where the passages are nearly in alinement to a position where the passages have an angular relation to each other, and it will also be plain that the member 5 may be rotated upon the member 1 through an angular extent of about 90°. It will further be obvious that though in Fig. 3 the coupling members are arranged to form a U-shaped coupling, the curvature of this coupling might be varied to a relatively large degree.

The angular relation of the coupling member 1 to the union 11 is permitted by the convexly curved outer faces of the ears 4, thus permitting the member 1 to rock upon the flange 12 as upon a bearing.

Inasmuch as the socket 7 and the head 2 are both semicylindrical and fit snugly upon each other, it will be obvious that the coupling members can not rotate upon each other around their axes, and it will also be plain that the semicylindrical head fitting in the semicylindrical socket prevents any sidewise movement of the couplings relative to each other.

The lip 10 forms practically an extension of the wall of the socket 7, which extension closes the slot 3 in the head 2 when the coupling members are arranged in the position shown in Fig. 3. This lip 10 therefore forms an apron which assists in closing the slot 3 and which also assists in holding the parts in rigid relation with each other after the union nut is in place.

Where it is desired to join two pipes which are not in absolute alinement, it is extremely difficult to connect a coupling between the pipes. With my improved coupling, this connection between the pipes is very easily made for the reason that the coupling members may be shifted slightly with relation to each other when being applied to allow for a slight variation in alinement of the two pipes and then may be locked in their proper position.

When it is desired to secure the sections of the pipe together which are in approximate alinement with each other, the member 1 is turned around and inserted in the member 5 in a position reverse of that in which it is applied when the parts form an elbow or U as in Fig. 3. After the head 2 is inserted within the socket 7 the union 11, which loosely surrounds the body of the coupling 1, may be screwed down in engagement with the screw threads 9 on the member 5. When screwed tightly in place, the union nut holds the two parts of the coupling absolutely locked and will prevent, when tightly screwed down, any movement of one coupling relative to the other. If, however, it is desired that one coupling member shall have a relatively slight movement relative to the other, the nut 11 need not be screwed down quite so tightly, and under these circumstances the member 1 will rock upon the member 5.

What I claim is:

1. A coupling comprising a hollow male member having a contracted neck and a relatively large approximately cylindrical head with flat ends and formed with an arcuate slot in the periphery of the head connecting with the interior of the member, said slot extending nearly around the head, a female member having an enlarged head formed with an approximately semicylindrical socket having flat ends and adapted to receive the head of the male member and also formed with an arcuate slot adapted to register with the slot in the head of the female member when the members are brought into engagement with each other, rounded lugs disposed upon the ends of the male member, and a coupling collar surrounding the male member and having screw threads engaging the exterior of the female member and being formed with a flange engaging the rounded faces of said lugs to hold the members in rigid relation to each other but to permit an annular depression of the members with relation to each other.

2. A coupling comprising a hollow male member having an approximately cylindrical head with flat ends, arcuate slot on its face connecting with the interior of the member, said male member being curved, a female member having an enlarged head formed with an approximately semicylindrical socket having flat ends and adapted to receive the head of the male member, and also formed with an arcuate slot adapted to register with the slot in the head of the female member when the members are brought in engagement with each other, the rim of the head of the female member being formed with a projecting lug whose inner surface forms a continuation of the inner surface of said socket, said lug being disposed in alinement with the slot in said socket and being adapted to overlie the end of the slot in the head of the male member when the members are turned into angular relation to each other, the longitudinal axis of the female member being at an acute angle to the face of the enlarged head thereof, and means carried by one member and adjustably engaging the other member to hold the members in rigid relation to each other.

3. A coupling comprising a hollow male member having an approximately cylindrical head with flat ends and formed with an arcuate slot on its face connecting with the interior of the member, said male member being curved, a female member having an enlarged head formed with an approximately semicylindrical socket having flat ends and adapted to receive the head of the male member and also formed with an arcuate slot adapted to register with the slot in the head of the female member when the members are brought in engagement with each other, the rim of the head of the female member being formed with a projecting lug whose inner surface forms a continuation of the inner surface of said socket, said lug being disposed in alinement with the slot in said socket and being adapted to overlie one end of the slot in the head of the male member when the members are turned into angular relation to each other, the longitudinal axis of the female member being at an acute angle to the face of the enlarged head, lugs disposed upon the end faces of the male member, and a coupling collar surrounding the male member and having a flange adapted to engage with said lugs, said collar being internally screw threaded for engagement with external threads upon the periphery of the female member.

4. A coupling comprising a hollow male member having a contracted neck and an enlarged head having flat sides, a female member having an enlarged circular head externally screw threaded and adapted to receive the head of the male member, the peripheral face of the male member and the interior end wall of the female member having mating grooves, oppositely disposed lugs projecting from the flat exterior side faces of the male member and disposed at the rear margin of the head thereof, each lug having a rounded face directed away from the extremity of the head, and a circular collar loosely embracing the male member and having a flange adapted to slidingly engage with the rounded faces of the lugs, said collar being interiorly screw threaded for engagement with the screw threads on the female member.

In testimony whereof I affix my signature in presence of two witnesses.

CHARLES R. BYAM. [L. S.]

Witnesses:
HERBERT A. MONROE,
W. I. McCALL.

---

Copies of this patent may be obtained for five cents each, by addressing the "Commissioner of Patents, Washington, D. C."